(12) United States Patent
Wang

(10) Patent No.: US 6,575,537 B1
(45) Date of Patent: Jun. 10, 2003

(54) DOUBLE DECK WHEEL COVER

(76) Inventor: Johnny Wang, No. 11, Alley 18, Lane 44, Chungyi Street, Yung Kang, Tainan Hsien (TW)

( * ) Notice: Subject to any disclaimer, the term of this patent is extended or adjusted under 35 U.S.C. 154(b) by 0 days.

(21) Appl. No.: 10/183,371

(22) Filed: Jun. 28, 2002

(51) Int. Cl.$^7$ ................................................ B60B 7/06
(52) U.S. Cl. ................................ 301/37.23; 301/37.32; 301/37.106
(58) Field of Search ........................ 301/37.101, 37.102, 301/37.31, 37.32, 37.33, 37.34, 37.42, 37.22, 37.23, 37.24, 37.106, 37.107

(56) References Cited

U.S. PATENT DOCUMENTS

| | | | | |
|---|---|---|---|---|
| 2,386,234 A | * | 10/1945 | Lyon | |
| 2,909,390 A | * | 10/1959 | Wood | |
| 3,048,445 A | * | 8/1962 | Shoemaker | |
| 5,372,406 A | * | 12/1994 | Ohtsuka et al. | 301/37.23 |
| 6,059,375 A | * | 5/2000 | Shryock | 301/37.34 |
| 6,089,671 A | * | 7/2000 | Iacovelli et al. | 301/37.101 |
| 6,443,528 B1 | * | 9/2002 | Polka | 301/37.102 |

* cited by examiner

Primary Examiner—Russell D. Stormer
(74) Attorney, Agent, or Firm—Rosenberg, Klein & Lee

(57) ABSTRACT

A double deck wheel cover includes an inner part, and an outer part. The inner part is detachably fitted on a central portion of a wheel. The outer part has spaced connecting plates projecting from the inner side through corresponding slots of the inner part. Tension springs are connected to the connecting plates at outer ends. Inner ends of the springs are connected to a steel ring secured to the inner part. The outer part has a larger diameter than the outer part so that an outer edge thereof covers a portion of a lateral side of a tire joined to the wheel, thus reducing thickness of visible portion of the tire lateral side to make the tire to look like a sport tire that has a relatively low aspect ratio, i.e. the proportion of the thickness of the lateral portion to the width of the tread of the tire.

5 Claims, 7 Drawing Sheets

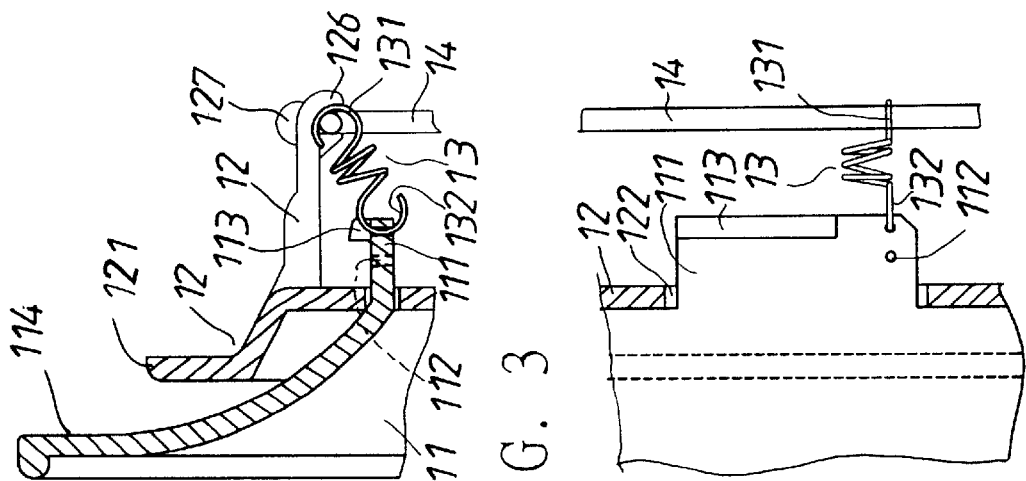
FIG. 3
FIG. 4
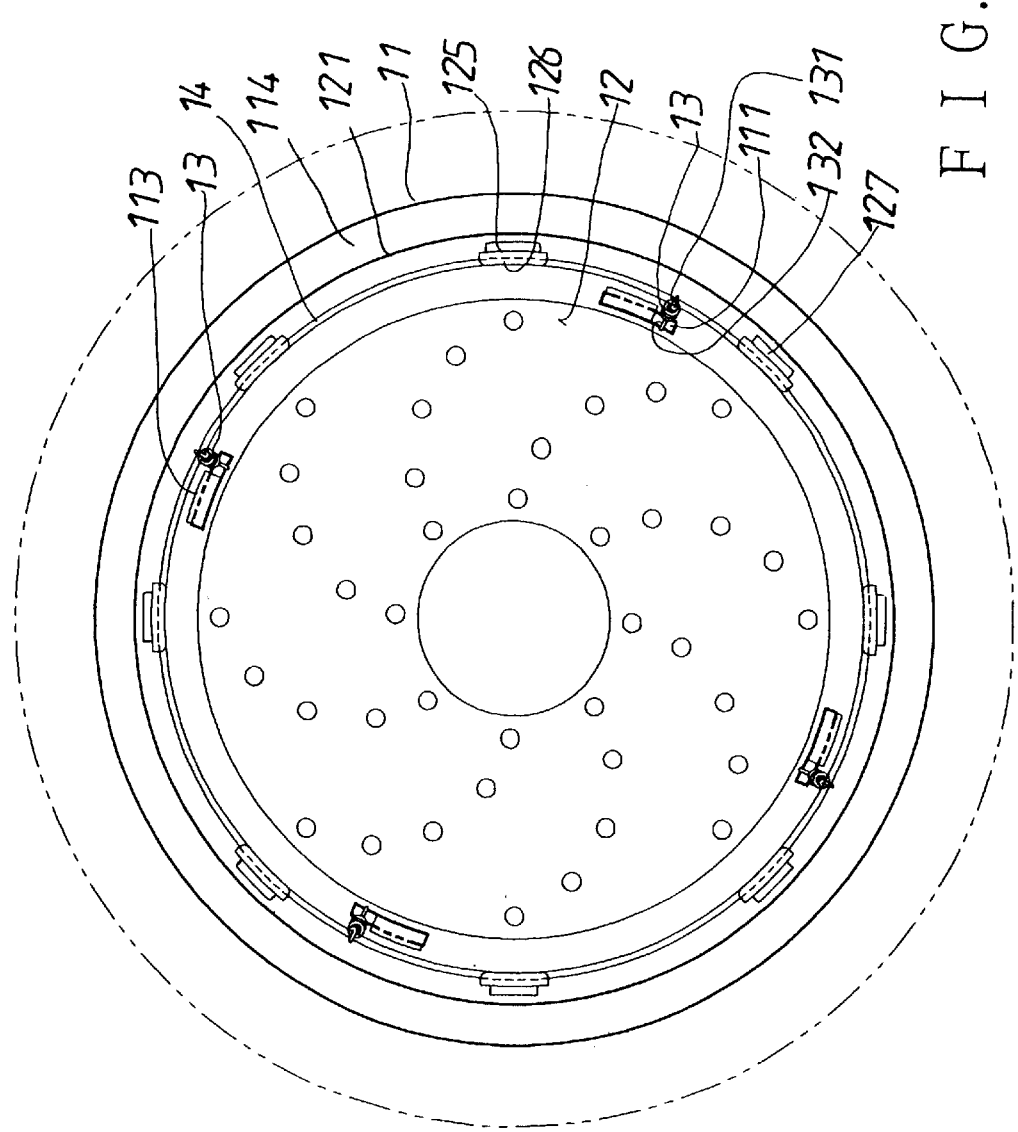
FIG. 2

DOUBLE DECK WHEEL COVER

BACKGROUND OF THE INVENTION

The present invention relates to a double deck wheel cover, and more particularly to one, which makes ordinary tires look like sport tires when fitted onto ordinary tires, and which is constructed such as not to easily fall off the tire.

Car tires are generally grouped into sport tires and ordinary ones. One major difference between sport tires and ordinary ones is aspect ratio, the proportion of the thickness of the lateral portion to the width of the tread; sports tires have lower aspect ratio than ordinary ones. For two tires of the same tread width, the one having lower aspect ratio will look lower and flatter. The main purpose of lowering the aspect ratio is to increase both stability and controllability of tires. However, tires with lower aspect ratios will cause reduction of comfort of the driver and passengers of the cars, and are much more expensive because they have to be made with relatively big width and increased strength. Therefore, lower aspect ratio tires are usually used on sport cars. Furthermore, ordinary wheels also have to be replaced with ones having bigger diameters so that lower aspect ratio tires can be fitted in place, causing increase of expense. In light of the fact that people would feel that low aspect ratio tires are more attractive and fashionable, some owners of non-sport cars spent relatively much money on substituting lower aspect ratio tires for the original ones, only to have reduced comfort of driving.

Referring to FIG. 11, a conventional wheel cover 2 includes a round edge 21, and several spaced connecting plates 22 sticking out from the inner side. The connecting plates 22 each has an out-facing engaging bar 222, and in-facing engaging protrusions 221 that oppose each other to define a space in between. A steel ring 23 is fitted between the protrusions 221. The wheel cover 2 is fitted on the central portion of the lateral side of a wheel by means of connecting the engaging bars 222, and the ring 23 to the wheel. Such wheel cover 2 has a monotonous appearance, and has only one function of covering the wheel, which is usually unattractive.

SUMMARY OF THE INVENTION

Therefore, it is a main object of the present invention to provide a wheel cover to a wheel, which can make ordinary tires look like low aspect ratio sport tires when fitted onto the wheel.

It is another object of the present invention to construct the present wheel cover such that it can't easily fall off the wheel.

The present wheel cover includes an inner part, and an outer part. The inner part is detachably fitted to a wheel. The outer part has spaced connecting plates projecting from the inner side and through corresponding slots of the inner part. Tension springs are connected to the connecting plates, and are joined to the inner part to allow the outer part to be displaced relative to the inner one without possibility of falling off when the wheel hits all object. The outer part is made to be bigger than the outer part so that an outer edge thereof covers a portion of a lateral side of a tire joined to the wheel. Thus, thickness of visible portion of the tire lateral side is reduced to cause the tire to look like a sport tire.

BRIEF DESCRIPTION OF THE DRAWINGS

The present invention will be better understood by reference to the accompanying drawings, wherein:

FIG. 2 is a rear view of the double deck wheel cover of the present invention.

FIG. 3 is a partial side view of the double deck wheel cover of the present invention.

FIG. 4 is another partial side view of the double deck wheel cover of the present invention.

DETAILED DESCRIPTION OF THE PREFERRED EMBODIMENTS

Figure 1:
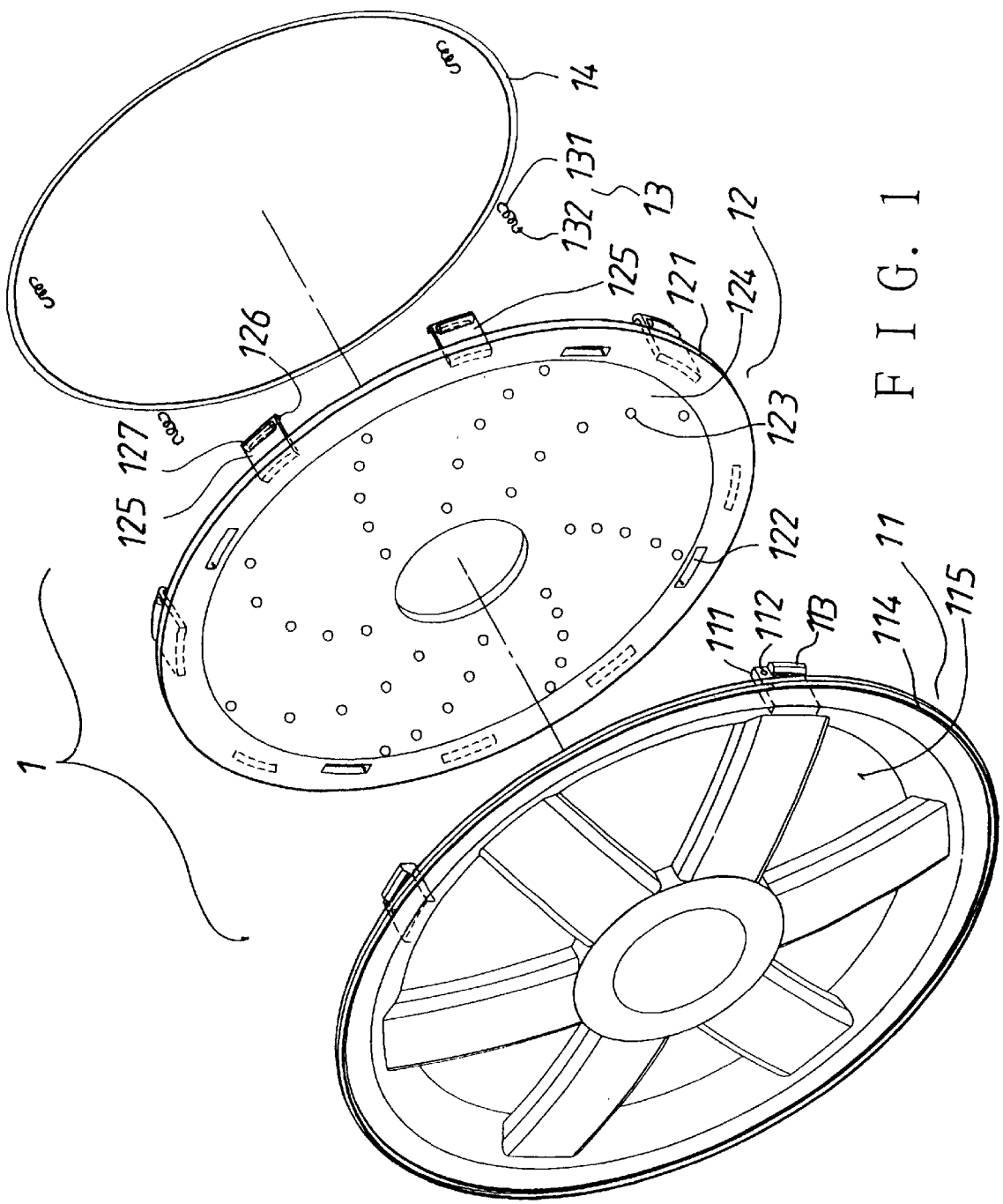
FIG. 1 is an exploded perspective view of the double deck wheel cover of the present invention.

Referring to FIG. 1, a wheel cover of the present invention includes an outer part 11, and an inner part 12 both made of plastic materials.

The inner part 12 has slots 112 spaced along an imaginary circle near an outer edge 121 thereof, and has several connecting plates 125 sticking out form the inner side and also spaced along the imaginary circle. The connecting plates 125 each has an out-facing engaging bar 127, and two in-facing engaging protrusions 126 that oppose each other to define a space in between. A steel ring 14 is fitted onto the space between each pair of the engaging protrusions 126 so that it is secured to the inner part 12.

The outer part 11 has connecting plates 111 projecting out form an inner side to correspond to the slots 112 of the inner part 12. The connecting plates 111 each have an out-facing engaging bar 113, and several through holes 112 thereon. The outer part 11 is detachably fitted on an outer side of the inner part 12 with the connecting plates 111 being passed through respective ones of the slots 122, and with tension springs 13 being connected to the through holes 112 at outer ends 132, and to the steel ring 14 at inner ends 131 to prevent the outer part 11 from falling off the inner part 12. The engaging bars 113 of the connecting plates 111 are disposed on the inner side of the inner part 12 when the inner and the outer parts 11, and 12 are joined together. The outer part 11 is made to have a larger diameter than the outer part 12 so as to cover a portion of a lateral side of a tire with the outer edge thereof when the present wheel cover is joined to a wheel.

The reason more than one through hole 112 is formed on each of the connecting plates 111 of the outer part 11 is that the same allow the outer end 132 of each of the springs 13 to be connected to a selected one among them for adjustment of tension of the spring 13.

In addition, the outer part 11 is provided with several gaps 115 between the outer edge 114 and the center thereof so that it is more attractive. Further, several vent holes 123 are formed on the inner part 12 also as ornaments.

Figure 5:
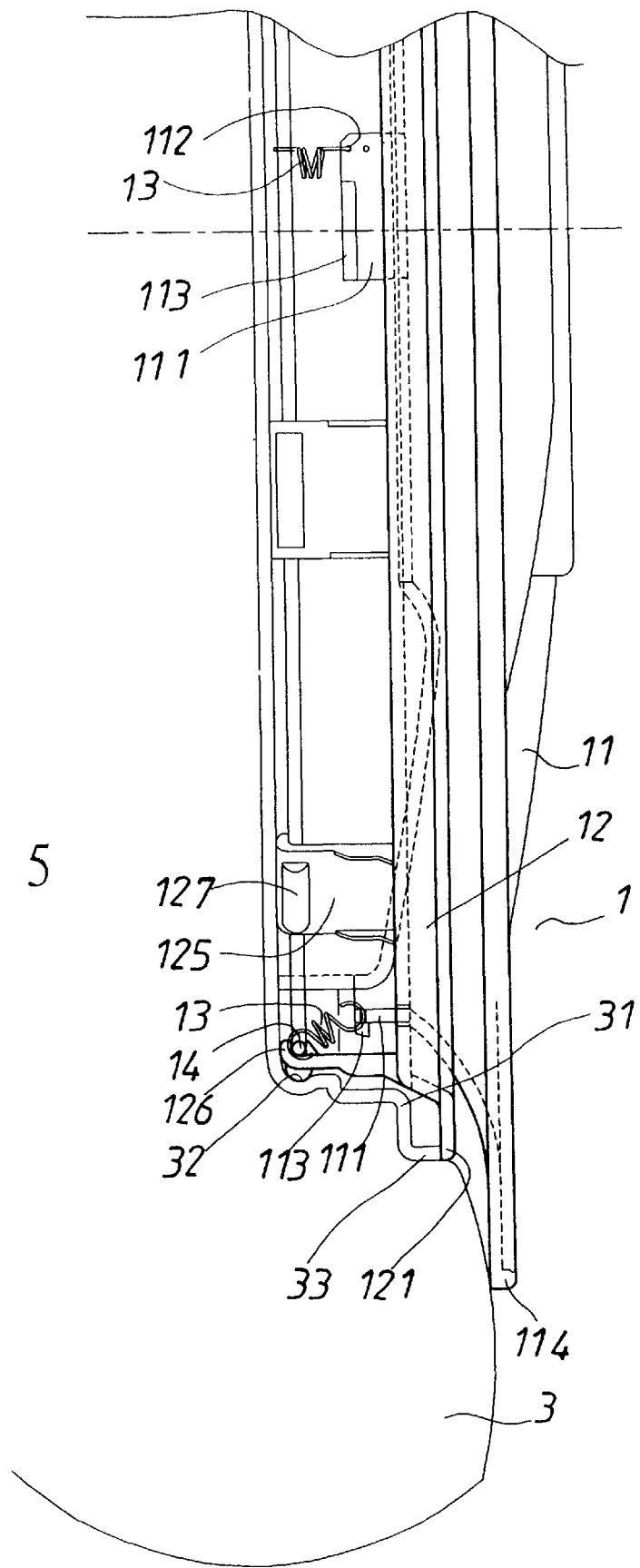
FIG. 5 is a partial side view of the present double deck wheel cover fitted on a wheel.
Figure 6:
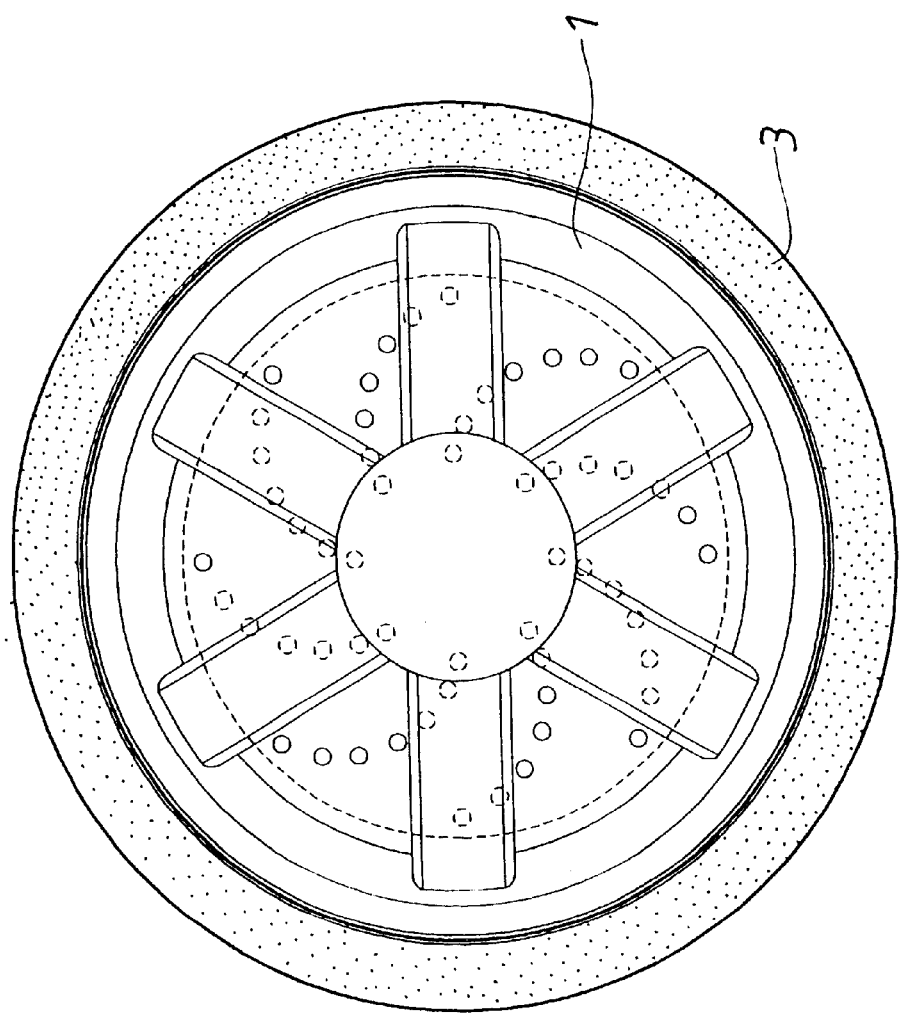
FIG. 6 is a front view of the present double deck wheel cover fitted on a wheel.
Figures 7, 8:
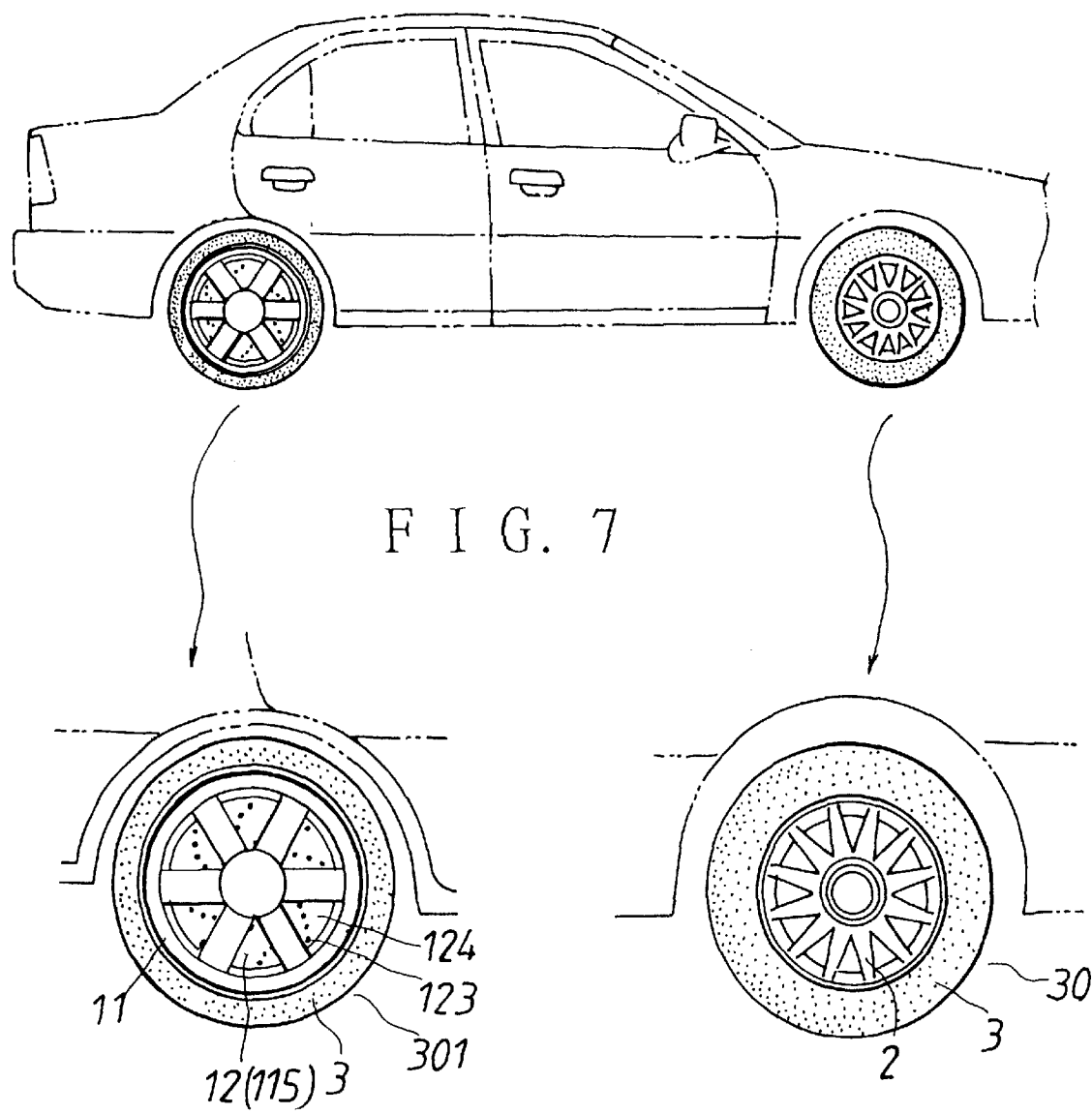
FIG. 7 is a view showing the function of the present double deck wheel cover.
FIG. 8 is a partial enlarged view of FIG. 7.
Figure 10:
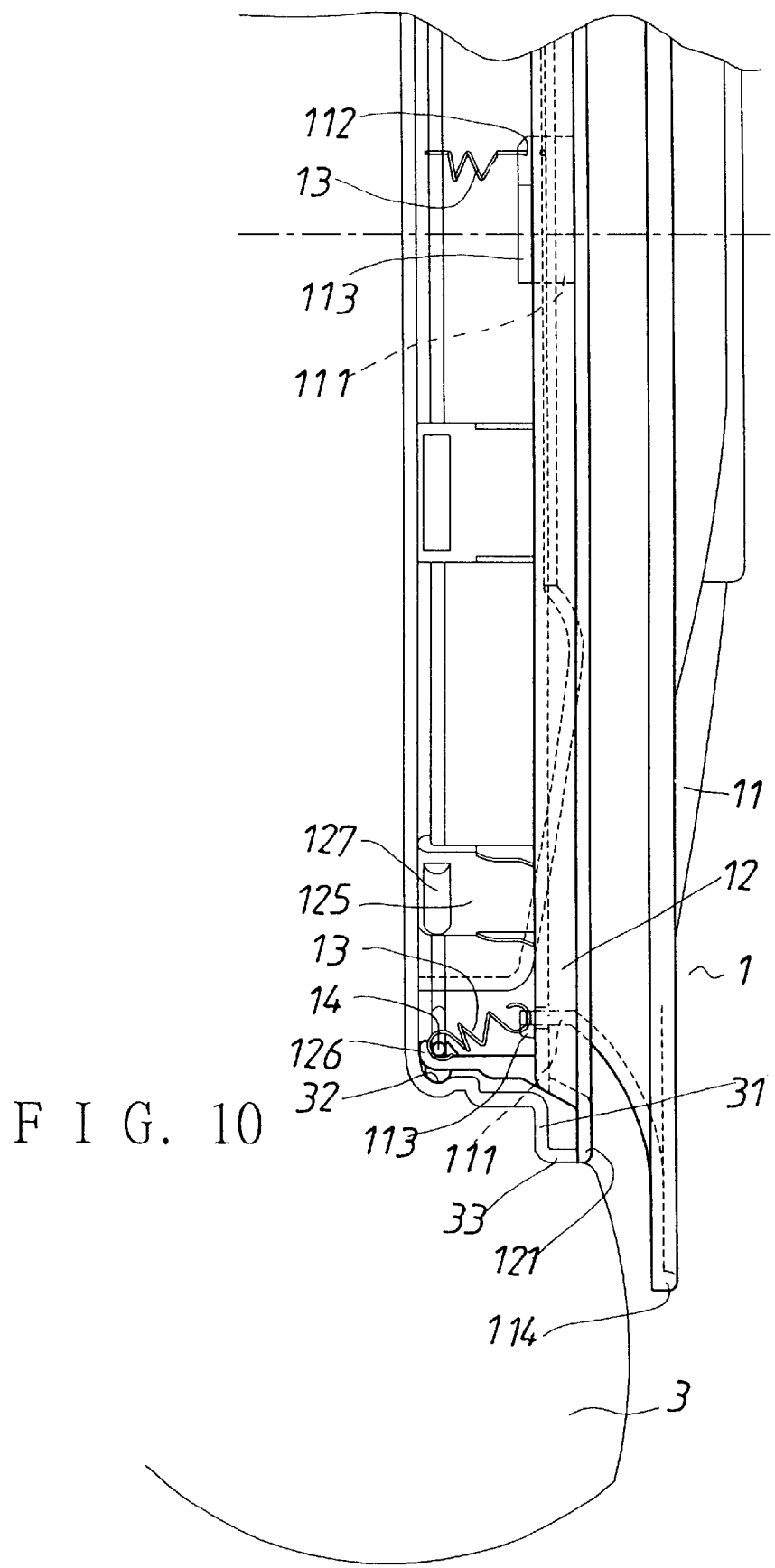
FIG. 10 is a partial view of the present double deck wheel cover being removed from the wheel.
Figure 11:
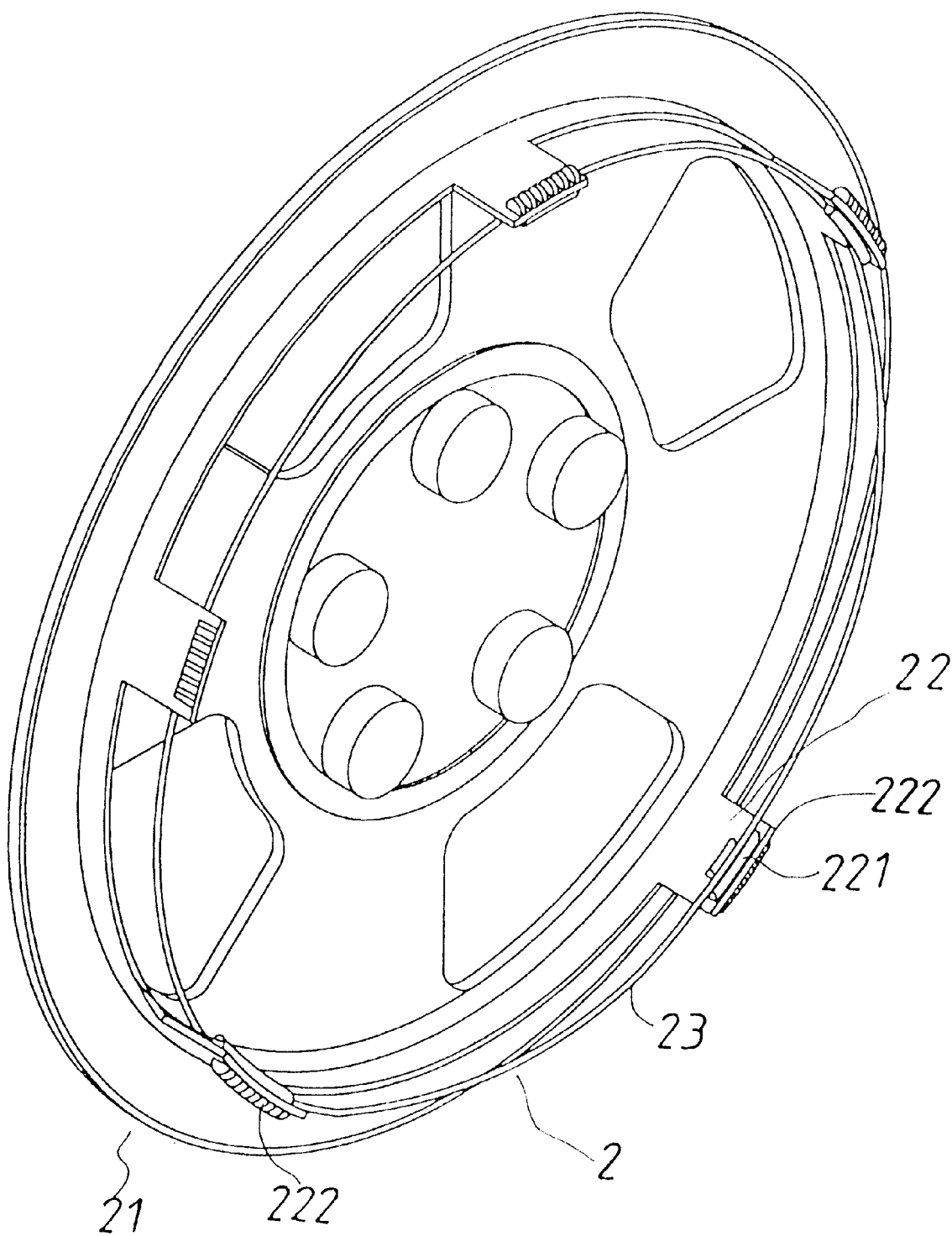
FIG. 11 is a perspective view of the conventional wheel cover.

Referring to FIGS. 5 and 6, to join the present wheel cover to a wheel 31 connected to a tire 3, the engaging bars 127 are passed onto an annular groove 32 of the wheel 31, and the outer edge 121 of the inner part 12 comes into contact with an outer edge 33 of the wheel 31 so that the outer edge 114 of the outer part 11 is disposed close to the tire 3 to cover a portion of the same. Thus, the tire 3 is made to look like one of the type having low aspect ratio by means of the outer part 11. In other words, the visible proportion of the thickness of the lateral side of the tire 3 to the width of the tread of the tire 3 is reduced.

Figure 9:
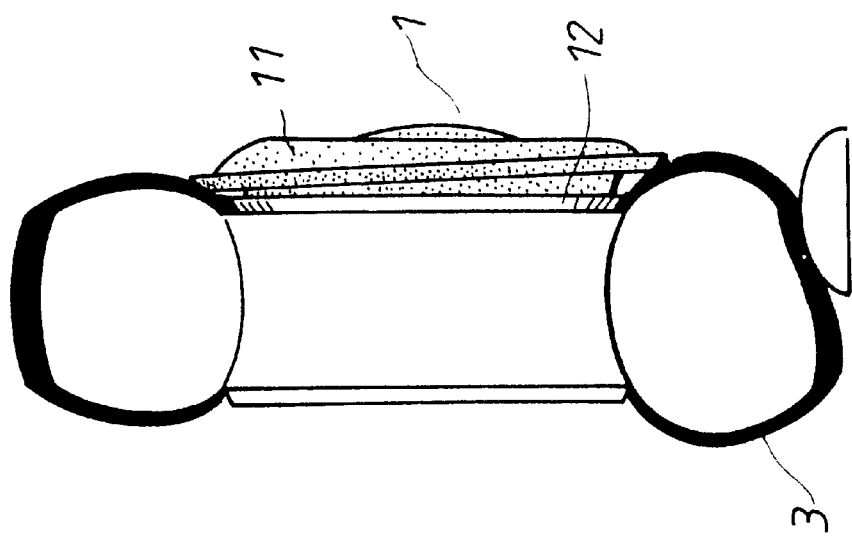
FIG. 9 is a view showing change of position of the present double deck wheel cover in response to the wheel hitting an object.

Referring to FIG. 9, when the tire 3 hits an object on the road in driving, it will deform to cause a change of position of the outer part 11 because the outer edge 114 of the outer part 11 is close to the same. The displacement of the outer part 11 in response to the tire 3 hitting an object will not cause the present wheel cover to fall off the wheel 31 owing to the springs 13. The springs 13 will make the outer part 11 move to the original position as soon as the tire 3 is away from the object.

Because the engaging bars 113 of the outer part 11 are disposed on the inner side of the inner part 12 to engage edges of the slots 122 of the inner part 12, the inner part 12 will move away from the wheel 31 together with the outer part 11 when the outer part 11 is removed form the wheel.

From the above description, it can be easily understood that the double deck wheel cover of the present invention has advantages as followings:

1. Because of the present double deck wheel cover, owners of non-sport cars don't have to substitute lower aspect ratio tires for the original cheaper ordinary ones in order for their cars to look more attractive and fashionable.
2. Because of the present double deck wheel cover, ordinary tires can look like sport tires that are more attractive and fashionable while providing more comfort to the drivers and the passengers than the sport tires having low aspect ratio.
3. The springs 13 allow the outer part 11 to move in response to the tire 3 hitting an object without falling off the wheel 31, and will make the outer part 11 move to the original position as soon as the tire 3 is away from the object.
4. The wheel cover is relatively strong and longwearing as compared with conventional ones also made of plastics because it consists of the parts 11, and 12.
5. Owners of non-sport cars don't have to replace the original wheels with bigger ones that are relatively expensive since they don't have to substitute sport tires for the original cheaper ordinary ones.
6. The appearance of the present wheel cover can be changed according to the car owners' need solely by means of changing the outer part 11. Therefore, the expense of changing a present wheel cover is not higher than that of changing a conventional one.
7. The ornamental vent holes 123 make the inner part 12 look like a disc brake, and the gaps 115 of the outer part 11 allow the inner part 12 to be easily visible, helping the car look attractive and fashionable.
8. The inner part 12 of the present wheel cover can be firmly joined to a wheel like conventional wheel covers, helping increase convenience of use of the present wheel cover.
9. The use of elastic members 13 for connecting the outer part 11 to the inner part 12 reduces risk of damage of both the tire and the present wheel cover, and allows the outer part 11 to be presented with a bigger diameter range for helping the wheel cover to be made with a variety of designs and patterns.

What is claimed is:

1. A wheel cover, comprising an inner part detachably fitted on a central portion of a wheel; the inner part having slots spaced near an outer edge thereof; an outer part having connecting plates sticking out from an inner side and spaced near an outer edge thereof; the outer part being detachably fitted on an outer side of the inner part with the connecting plates being passed through respective ones of the slots;

elastic members connecting the connecting plates to a steel ring secured to an inner side of the inner part to allow the outer part to be displaced relative to the inner part without falling off;

the outer part having an at least slightly larger diameter than the outer part so as to cover a portion of a lateral side of a tire joined to the wheel with the outer edge thereof thus reducing thickness of visible portion of the lateral side of the tire.

2. The wheel cover according to claim 1, wherein the outer part is provided with a plurality of gaps between an outer edge and a center thereof and the inner part is formed with a plurality of vent holes thereon.

3. The wheel cover according to claim 1, wherein each of the connecting plates of the outer part has an engaging bar on an inner end portion thereof; the engaging bars being disposed on the inner side of the inner part when the outer part is fitted on the inner park, thus engaging edges of the slots of the inner part to cause the inner part to move away from the wheel together with the outer part when the outer part is removed form the wheel.

4. The wheel cover according to claim 1, wherein each of the connecting plates of the outer part has at least two through holes for allowing outer ends of the elastic members to be connected to a selected one of same for adjustment of tension of the elastic members securing the outer part to the steel ring of the inner part.

5. The wheel cover according to claim 1, wherein the elastic members are tension springs.

* * * * *